Figure 3:
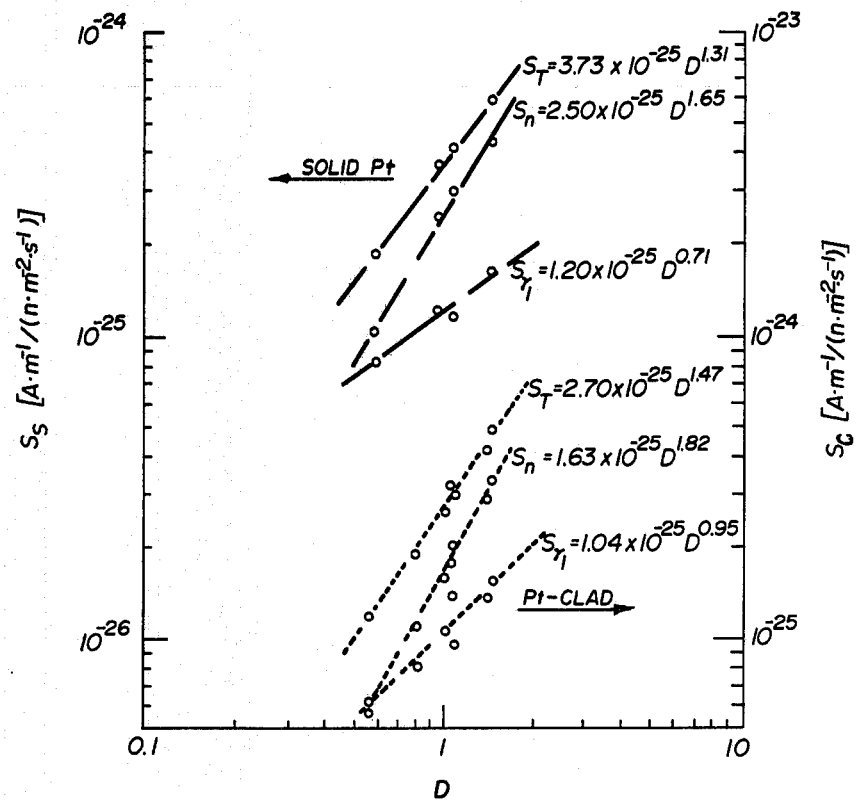

United States Patent [19]

Allan et al.

[11] 4,284,893
[45] Aug. 18, 1981

[54] SELF-POWERED NEUTRON AND GAMMA-RAY FLUX DETECTOR

[75] Inventors: Colin J. Allan; Ross B. Shields, both of Deep River; Jerry M. Cuttler, Mississauga; Gerard F. Lynch, Deep River, all of Canada

[73] Assignee: Atomic Energy of Canada Limited, Ottawa, Canada

[21] Appl. No.: 21,481

[22] Filed: Mar. 19, 1979

[30] Foreign Application Priority Data

Apr. 20, 1978 [CA] Canada .................................. 301514

[51] Int. Cl.³ ............................................... G01T 3/00
[52] U.S. Cl. .................................. 250/390; 176/19 R
[58] Field of Search ............................ 250/390-392; 176/19 R, 19 EC, 19 J

[56] References Cited

U.S. PATENT DOCUMENTS

| | | | |
|---|---|---|---|
| 3,050,624 | 8/1962 | Kanner | 250/390 |
| 3,565,760 | 2/1971 | Parkos et al. | 250/390 |
| 3,872,311 | 3/1975 | Goldstein et al. | 250/390 |
| 3,904,881 | 4/1975 | Klar et al. | 250/390 |
| 4,080,533 | 3/1978 | Todt et al. | 250/390 |
| 4,087,693 | 5/1978 | Brown et al. | 250/390 |
| 4,118,626 | 10/1978 | Goldstein et al. | 250/390 |
| 4,123,658 | 10/1978 | Johansson | 250/390 |

Primary Examiner—S. A. Cangialosi
Attorney, Agent, or Firm—Francis W. Lemon

[57] ABSTRACT

A self-powered neutron and gamma-ray flux detector is provided wherein the emitter comprises an emitter core of at least one material selected from nickel, iron, titanium and alloys based on these metals, and an emitter outer layer around the core which has a thickness in the range of the order of 0.03 mm to of the order of 0.062 mm and which is of at least one material selected from platinum, tantalum, osmium, molybdenum and cerium. With this construction, by increasing the emitter diameter beyond the optimum for a solid platinum emitter, the ratio of neutron to gamma-ray sensitivity, and hence the prompt response fraction, is increased while an acceptably small burnup rate is maintained. Larger diameter emitters of this construction have response characteristics that closely match those required for a fuel power detector in, for example, heavy-water-moderated, natural-uranium power reactors. The emitter core is preferably of Inconel (Trademark) and the emitter jacket is preferably of platinum.

1 Claim, 3 Drawing Figures

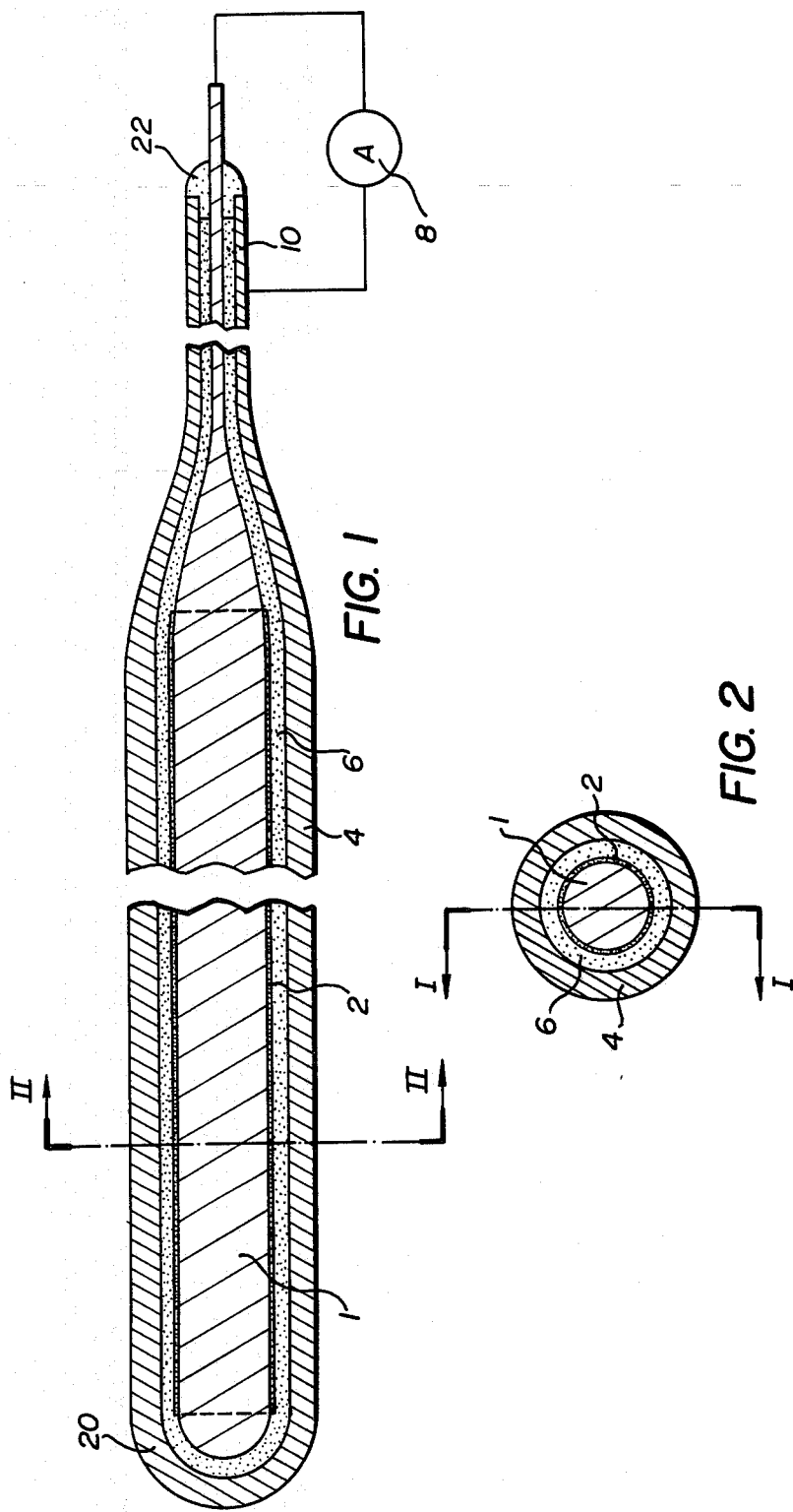

SELF-POWERED NEUTRON AND GAMMA-RAY FLUX DETECTOR

This invention relates to a self-powered neutron and gamma-ray flux detector.

It has already been proposed in U.S. Pat. No. 3,787,697, dated Jan. 22, 1974, R. B. Shields, to provide a self-powered flux detector, having an emitter of platinum, cerium, osmium or tantalum, which will simultaneously respond to the intensities of a mixture of neutron flux and gamma-ray flux. The emitter is conveniently in the form of a wire coaxially disposed in, and electrically insulated from, a tubular collector by dielectric insulation. The tubular collector is, for example, of a nickel-chromium-iron alloy and the dielectric insulation may be magnesium oxide powder. This type of self-powered flux detector has the advantage that, by simultaneously responding to the intensities of mixed flux, that is both the neutron and gamma-ray flux intensities at once, a higher prompt electrical current output fraction can be maintained throughout life than in neutron detectors having low sensitivity to gamma-ray flux such as, for example, those proposed in U.S. Pat. No. 3,375,370, dated Mar. 26, 1968, J. W. Hilborn, and a higher total output than gamma-ray detectors having low sensitivity to neutron flux such as, for example, those proposed in U.S. Pat. No. 3,591,811, dated July 6, 1971, R. B. Shields.

The detector of the present invention is particularly useful for monitoring neutron and gamma-ray flux intensities in nuclear reactor cores wherein the neutron and gamma-ray flux intensities are closely proportional, are ultimately related to the fission rate, and are used as measurements of nuclear reactor power.

More recently it has been proposed in U.S. Pat. No. 3,872,311, dated Mar. 18, 1975, N. P. Goldstein and W. H. Todt, to provide a self-powered neutron flux detector wherein a thin conductive layer of low neutron cross-section, high-density material, for example, patinum, lead or bismuth, is disposed about an emitter core of a material which spontaneously emits radiation on neutron capture, for example, cobalt or gold. The high density material is absorptive of low energy beta radiation emitted by decay of the emitter core activation product, but is substantially transmissive to the high average energy prompt electrons emitted by the emitter core materials.

In contrast, in the present invention, the function of the emitter outer layer of high atomic number is that of a gamma-ray/electron converter and the thickness of platinum required to impart the required gamma-ray sensitivity to the detector is so small that it would not be an effective beta-ray absorber in any case. Further, the Inconel or other materials proposed in the present invention for the emitter core do not have substantial amounts of undesirable delayed low-energy emissions requiring suppression.

U.S. Pat. No. 3,904,881, dated Sept. 9, 1975, E. Klar, P. Haller and E. G. Runge, proposes in FIG. 1 a neutron detector having a neutron and gamma-ray sensitive emitter part of, for example, cobalt or vanadium, and a gamma-ray sensitive emitter part of, for example, Inconel, so that compensation for the gamma radiation is effected by measuring the difference between the two electrical currents, from the two emitter parts. In different embodiments shown in FIGS. 2, 3 and 5 in the Klar et al patent, emitter parts are proposed which result, in cooperation with the collector, in gamma-ray sensitivities of different polarity, for example, one group of emitter parts are of tantalum, zirconium or platinum while the other group of emitter parts are of cobalt. It will be appreciated that while the embodiment described with reference to FIG. 1 of the Klar et al patent mentions Inconel as one emitter part and the embodiments described with reference to FIGS. 2, 3 and 5 mention platinum as an emitter part, the objective of using these emitter parts together is to cancel their respective gamma-ray sensitivity contributions so that the resultant is substantially zero. Because the objective of the present invention is opposite to that of the Klar et al patent, namely to maximize the gamma-ray sensitivity, the teachings of the Klar et al patent would, in fact, lead a person skilled in the art away from using these parts together in the emitter. Further, to achieve the desired gamma-ray sensitivity compensation of the Klar et al patent, both the Inconel and platinum parts would have to be exposed together on the surface of the emitter, i.e. one emitter part could not be enclosed within the other. In contrast, in some embodiments of the present invention, the gamma-ray sensitivity is maximized by disposing the platinum as an outer layer over the whole of the emitter surface, while the Inconel emitter core, being enclosed by the platinum, does not contribute substantially to the gamma-ray sensitivity of the detector.

Thus it will be seen that the prior art can be divided into two types of self-powered detectors, namely, self-powered detectors that are mainly sensitive to either neutron flux or gamma-ray flux, and self-powered detectors that are sensitive to both neutron flux and gamma-ray flux.

The present invention provides a new type of self-powered detector which is sensitive to both neutron flux and gamma-ray flux and wherein the emitter is in two parts, namely a core and an outer layer. The materials for the core are chosen to produce neutron capture gamma-rays which then generate high-energy electrons on exposure to neutrons as in the case of other simple emitters of that type, such as Co, Au, Cd, Gd, Tm, and Re. The function of the outer layer is two-fold in that its material is chosen so that it acts as a gamma-ray/electron converter and, by virtue of its higher atomic number and higher back-scattering coefficient that the collector, increases the net outflow or emission of electrons. In other words, the fraction of electrons emitted by the emitter that are reflected back by the collector is less than the fraction of electrons emitted by the collector that are reflected back by the emitter. The thickness of the outer layer required to achieve this is very small. Further, this combination of an emitter outer surface layer and collector inner surface responds to external reactor gamma-rays as well as neutron-produced, capture-gamma-rays from the collector.

In high-flux nuclear reactors, virtually all of the prompt-responding emitter materials which have been proposed (Co, Au, Cd, Tm, Re, etc.) have such a high neutron capture cross-section that they burn up too fast. The material for the emitter core of detectors according to the present invention is chosen to have a cross-section which is moderately low and will burn up very slowly while producing a good yield of capture gamma-rays.

According to the present invention, there is provided a self-powered neutron and gamma-ray flux detector, comprising:

(a) an emitter core,
(b) an emitter outer layer around the core,
(c) a collector around the emitter outer layer, and
(d) dielectric insulation electrically insulating the emitter outer layer from the collector,
and wherein the improvement comprises:
(e) the emitter core is of at least one material selected from the group consisting of nickel, iron, titanium and alloys based on these metals, and the emitter outer layer has a thickness in the range of the order of 0.03 mm to of the order of 0.062 mm and, is of at least one material selected from the group consisting of platinum, tantalum, osmium, molybdenum and cerium.

Preferably the emitter core is a nickel-base alloy marketed under the Trademark Inconel alloy 600T and containing by weight 76% nickel, 15.8% chromium, 7.20% iron, 0.20% silicon, 0.10% copper, 0.007% sulphur, and 0.04% carbon, with less than 0.1% by weight cobalt and less than 0.2% by weight manganese, and the emitter outer layer is of platinum.

In the accompanying drawings which illustrate, by way of example, an embodiment of the present invention, FIG. 1 is a broken, sectional side view along I—I, FIG. 2 of a self-powered neutron and gamma-ray flux detector, FIG. 2 is a sectional end view along II—II, FIG. 1, and FIG. 3 is a graph of test results of the neutron, gamma-ray and total flux sensitivities for self-powered neutron and gamma-ray flux detectors, having solid and platinum-clad emitters, as a function of the emitter diameter.

Referring to FIGS. 1 and 2, there is shown a self-powered neutron and gamma-ray flux detector, comprising:
(a) an emitter core 1,
(b) an emitter outer layer 2 around the core 1,
(c) a collector 4 around the emitter outer layer 2, and
(d) dielectric insulation 6 electrically insulating the emitter outer layer 2 from the collector 4,
and wherein the improvement comprises:
(e) the emitter core 1 is of a material selected from the group consisting of nickel, iron, titanium and alloys based on these metals, and the emitter electrode outer layer 2 has a thickness in the range of the order of 0.03 mm to of the order of 0.062 mm and is of a material selected from the group consisting of platinum, tantalum, osmium, molybdenum and cerium.

In one embodiment, the emitter core 1 is of Inconel and has a platinum layer forming the emitter outer layer 2 drawn thereon from an oversize tube so that the emitter core 1 and the emitter outer layer 2 are in electrically conductive contact along their lengths. A means 8 for measuring the magnitude of an electrical current between the emitter core 1 and the collector 4 is connected to these electrodes by a coaxial extension cable 10 formed integrally with the detector. The dielectric insulation 6 in this embodiment is a compressed metal oxide powder, for example, magnesium oxide powder. The dielectric insulation is sealed by a closed end 20 of the collector electrode 4 and an electrically-insulating, epoxy-resin seal 22 at the end of the cable 10.

CALCULATIONS AND TEST RESULTS OF DETECTOR CURRENT OUTPUT RESPONSE FOR DETECTORS HAVING SOLID PLATINUM EMITTERS AND EMITTERS CONSISTING OF A CORE OF INCONEL SURROUNDED BY A LAYER OF PLATINUM

The electrical currents generated by emitters of V and Co in self-powered detectors, such as, for example, those disclosed in the previously mentioned Hilborn patent, are dominated by neutron-induced events. The situation is not so simple for detectors having Pt emitters because a significant fraction of the total electrical current generated is due to reactor gamma-rays. Prior to these tests it was postulated that the neutron sensitivity would vary as the cube of emitter diameter, and the gamma-ray-induced current would vary linearly with emitter diameter. Hence, the ratio of neutron to gamma-ray-induced currents was expected to increase significantly with increasing detector size, and the implications of this will now be considered.

At a mid-lattice position in a heavy-water-moderated, natural-uranium reactor, only ~70% of reactor gammarays are prompt. Thus, not all of the current generated in a Pt detector follows reactor flux transients promptly.

If it is assumed that the total electrical current generated, $I_T$, is a linear superposition of a gamma-rayinduced electrical current, $I_\gamma$, and a neutron-induced electrical current, $I_n$, i.e.

$$I_T = I_\gamma + I_n \quad (1)$$

then $$\frac{I_{prompt}}{I_T} \approx 0.7 \frac{I_\gamma}{I_T} + \frac{I_n}{I_T} \quad (2)$$

Three sensitivities per unit length for Pt emitter detectors can be defined:
(i) a total sensitivity, $$S_T = I_T/\phi L \quad (3)$$

(ii) a neutron sensitivity, $$S_n = I_n/\phi L \quad (4)$$

and (iii) a $\gamma$-ray sensitivity, $$S_\gamma = I_\gamma/\phi L \quad (5)$$

where $\phi$ is the neutron flux, and
L is the sensitive length of the detector.
Note that the gamma-ray sensitivity is defined here in terms of the neutron flux, and so will depend on the neutron to gamma-ray flux ratio in the particular environment.

The neutron sensitivity will decrease with irradiation while the gamma-ray sensitivity will remain essentially constant. Thus, the prompt-response fraction will vary with irradiation, as will the total sensitivity, $S_T$, the variation depending on the initial neutron and gamma-ray sensitivities. Therefore, to properly assess the impact of changes in geometry on the performance of Pt detectors, it is necessary to determine how the neutron/gamma-ray sensitivity ratio, as well as the total sensitivity, vary with geometry. Both properties will depend on reactor type and detector location, i.e. the neutron/gamma-ray flux ratio. The values given in Table II below, apply to a mid-lattice position of a heavy-water-moderated, natural-uranium reactor for an irradiation time of ~1 hour, i.e. long-lived gamma-ray contributions are not included.

Two types of Pt-emitter detectors were tested, some having solid platinum emitters designated as solid, and others with emitters consisting of a core of Inconel surrounded by a thin (~0.05 mm) layer of platinum and within the scope of the present invention. It was expected that the sensitivities of the latter, designated as clad detectors, would vary less with irradiation than those of the solid-emitter type. An important additional advantage is the much smaller amount of Pt required for clad detectors, which has the potential for a significant saving in cost.

The mechanical dimensions of the Pt detectors tested are given in the following Table I while the experimental data on the Pt detectors are given in Table II. Although it is relatively straightforward to determine the total sensitivities, determining the neutron and gamma-ray sensitivities is complicated by the fact that it is difficult, if not impossible, to generate neutrons without also generating gamma-rays. Furthermore, the gamma-ray sensitivity determined in a $^{60}$Co Gammacell, a frequently-quoted sensitivity, does not provide an accurate measure of a Pt detector's sensitivity to reactor gamma-rays because of differences between the two gamma-ray energy spectra.

For the majority of the detectors tested, the neutron sensitivities were determined by means of a gamma-ray/neutron flux perturbation method. If the total sensitivities determined in two different reactor environments, A and B, having neutron fluxes $\phi_A$ and $\phi_B$, are defined as $S_{TA}$ and $S_{TB}$, and the neutron-induced and gamma-ray-induced currents are $I_{nA}$, $I_{nB}$ and $I_{\gamma A}$, $I_{\gamma B}$, respectively, then $$\frac{S_{\gamma A}}{S_{nA}} = \frac{S_{TB}/S_{TA} - 1}{I_{\gamma B}\phi_{nA}/I_{\gamma A}\phi_{nB} - S_{TB}/S_{TA}} \quad (6)$$

Since the total sensitivities and neutron fluxes are readily determined, equation (6) can be solved for the ratio $S_{\gamma A}/S_{nA}$ provided the ratio $I_{\gamma B}/I_{\gamma A}$ can be determined.

For the experiments, condition A corresponds to a normal mid-lattice position, while condition B was obtained by locating the flux-detector assembly at the centre of a thermal flux pit, formed by removing the five central fuel assemblies in the reactor core, and surrounding it with an annulus of Bi, ~2.5 cm thick, to suppress the gamma-ray flux relative to the neutron flux.

The ratio $I_{\gamma B}/I_{\gamma A}$ was determined using a coiled, self-powered detector having a lead emitter and an Inconel sheath.

It was found that the Pb detector had an appreciable neutron sensitivity and the raw data had to be corrected to take account of this. The neutron sensitivity was measured, independently, in the thermal column of the NRU test reactor at Chalk River Nuclear Laboratories, Canada, as follows:

The detector was first irradiated in the thermal column inside a thin (~0.24 cm) annulus of $^6$LiF, which reduced the neutron flux to a negligible level, without appreciably affecting the gamma-ray field. This provided a direct measure of $I_\gamma$ in the thermal column. A

TABLE I

MECHANICAL DIMENSIONS OF PLATINUM DETECTORS

| DETECTOR SERIAL NO. | TYPE | OD (mm) | SHEATH WALL (mm) | (g/m) | EMITTER DIAMETER (mm) | INSULATION THICKNESS (mm) | CLADDING THICKNESS (mm) |
|---|---|---|---|---|---|---|---|
| TC-1114 | Solid | 1.56 | 0.22 | 7.81 | 0.59 | 0.27 | NA |
| TC-1001 | Solid | 2.18 | 0.27 | 13.7 | 0.97 | 0.34 | NA |
| TC-0804 | Solid | 3.0 | 0.53 | 34.7 | 1.08 | 0.43 | NA |
| TC-0107 | Solid | 3.0 | 0.45 | 30.4 | 1.44 | 0.33 | NA |
| UC-0604 | Clad | 1.56 | 0.28 | 9.8 | 0.56 | 0.22 | 0.03 |
| TC-1017 | Clad | 2.18 | 0.35 | 17.0 | 0.81 | 0.34 | 0.055 |
| TC-1203 | Clad | 2.20 | 0.24 | 12.5 | 1.01 | 0.36 | 0.046 |
| TC-1113 | Clad | 2.18 | 0.32 | 15.8 | 1.06 | 0.24 | 0.045 |
| TC-1111 | Clad | 2.96 | 0.48 | 31.5 | 1.09 | 0.46 | 0.059 |
| TC-1202 | Clad | 2.98 | 0.33 | 23.2 | 1.40 | 0.46 | 0.062 |
| TC-1204 | Clad | 2.98 | 0.45 | 30.2 | 1.44 | 0.32 | 0.062 |

TABLE II

SUMMARY OF EXPERIMENTAL DATA FOR THE PLATINUM DETECTORS

SENSITIVITY PER UNIT LENGTH

| DETECTOR SERIAL NO | TYPE | $S_n$ [A·m$^{-1}$/(n·m$^{-2}$·s$^{-1}$) × 10$^{25}$] MEASURED | FITTED | $S_\gamma$ [A·m$^{-1}$/(n·m$^{-2}$·s$^{-1}$) × 10$^{25}$] MEASURED | FITTED $S_{\gamma 1}$ | $S_{\gamma 2}$ | $S_T$ [A·m$^{-1}$/(n·m$^{-2}$·s$^{-1}$) × 10$^{25}$] MEASURED | FITTED |
|---|---|---|---|---|---|---|---|---|
| TC-1114 | Solid | 1.02 ± 0.10 | 1.05 | 0.83 ± 0.09 | 0.82 | 0.85 | 1.85 ± 0.03 | 1.87 |
| TC-1001 | Solid | 2.45 ± 0.15 | 2.38 | 1.21 ± 0.15 | 1.17 | 1.16 | 3.65 ± 0.04 | 3.58 |
| TC-0804 | Solid | 2.98 ± 0.12 | 2.84 | 1.16 ± 0.12 | 1.26 | 1.14 | 4.14 ± 0.04 | 4.13 |
| TC-0107 | Solid | 4.35 ± 0.24 | 4.57 | 1.61 ± 0.18 | 1.55 | 1.67 | 5.96 ± 0.07 | 6.02 |
| UC-0604 | Clad | 0.57 ± 0.07 | 0.57 | 0.61 ± 0.07 | 0.60 | 0.63 | 1.18 | 1.15 |
| TC-1017 | Clad | 1.10 ± 0.10 | 1.11 | 0.80 ± 0.10 | 0.85 | 0.79 | 1.90 ± 0.03 | 1.98 |
| TC-1203 | Clad | 1.57 ± 0.17 | 1.66 | 1.05 ± 0.10 | 1.05 | 1.01 | 2.62 ± 0.03 | 2.73 |
| TC-1113 | Clad | 1.82 ± 0.18 | 1.81 | 1.38 ± 0.18 | 1.10 | 1.31 | 3.20 ± 0.10 | 2.94 |
| TC-1111 | Clad | 2.02 ± 0.09 | 1.91 | 0.95 ± 0.09 | 1.13 | 0.97 | 2.97 ± 0.05 | 3.06 |
| TC-1202 | Clad | 2.86 ± 0.13 | 3.01 | 1.34 ± 0.13 | 1.43 | 1.32 | 4.20 ± 0.10 | 4.41 |
| TC-1204 | Clad | 3.30 ± 0.15 | 3.17 | 1.55 ± 0.15 | 1.47 | 1.65 | 4.85 ± 0.10 | 4.60 | second irradiation, without the $^6$LiF annulus, yields $I_\gamma + I_n$, from which $I_n$ was obtained, and hence $S_n$.

The neutron sensitivities of two coiled detectors with solid Pt emitters, and a coiled Pt-clad emitter, were also determined in the thermal column using this technique. The results are summarized in the following Table III.

TABLE III

NEUTRON SENSITIVITIES FOR COILED SELF-POWERED DETECTORS DETERMINED IN THE NRU THERMAL COLUMN

| Detector Serial No. | Type | OD (mm) | Sheath Wall Thickness (mm) | (g/m) | Emitter Diameter (mm) | Length (mm) | $S_n$ [A · m$^{-1}$/(n · m$^{-2}$ · s$^{-1}$)] |
| --- | --- | --- | --- | --- | --- | --- | --- |
| UC-0703 | Pb | 2.67 | 0.48 | 27.8 | 0.81 | 1194 | 0.49 × 10$^{-25}$ |
| TC-0802 | solid Pt | 1.52 | 0.26 | 8.7 | 0.51 | 3000 | 0.90 × 10$^{-25}$ |
| TC-0803 | solid Pt | 2.03 | 0.51 | 20.5 | 0.51 | 3000 | 1.12 × 10$^{-25}$ |
| UC-0605 | Pt-clad | 2.99 | 0.45 | 30.3 | 1.44 | 997 | 3.75 × 10$^{-25}$ |

As can be seen, the neutron sensitivity of the Pb-emitter detector is comparable to that of the solid-Pt-emitter detectors. It is postulated that this large neutron sensitivity results from neutron-capture gamma-ray generated in the Inconel sheath. This hypothesis is supported by the greater neutron sensitivity of Pt-emitter detector TC-0803, compared with that of TC-0802, which would be expected from the greater sheath thickness of the former. The neutron sensitivities of detectors TC-0802 and TC-0803 imply a contribution of $\sim 1.9 \times 10^{-27}$ A·m$^{-1}$/(n·m$^{-2}$·s$^{-1}$) per g/m of Inconel in the emitter outer layer, whereas the neutron sensitivity of the Pb emitter detector implies a contribution of $\sim 1.8 \times 10^{-27}$ A·m$^{-1}$/(n·m$^{-2}$·s$^{-1}$) per g/m of Inconel. This good agreement with the theoretical assumption is significant. In addition, it was found that coiling a Pt-emitter detector increased its total sensitivity by $\sim 26\%$, presumably due to an increase in the local gamma-ray flux from neutron-capture events in adjacent coils.

In the perturbation experiments, after correcting the signal from the Pb detector for its neutron sensitivity, the ratio $I_{\gamma B}/I_{\gamma A}$ was found to be $$I_{\gamma B}/I_{\gamma A} = 0.20 \pm 0.10 \tag{7}$$

while the neutron flux ratio, determined by Cu foils, was found to be $$\phi_{nB}/\phi_{nA} = 1.18 \pm 0.02 \tag{8}$$

The ratio of the gamma-ray intensities was poorly defined, but the 50% uncertainty resulted in an uncertainty in neutron sensitivity of only $\sim 10\%$.

The neutron, gamma-ray and total sensitivities, $S_s$ and $S_c$, per unit length, obtained for the solid-Pt and Pt-clad-emitter detectors, respectively, are summarized in Table II and plotted in FIG. 3 as a function of emitter diameter, D in mm. In FIG. 3,
— O — represents the results for a solid Pt emitter, and
--- O --- represents the results for a Pt-clad emitter.

Each set of measured sensitivities, $S_n$, $S_\gamma$, and $S_T$, was fitted to a simple power law. For the detectors with solid Pt emitters this gave:

$$S_n = 2.50 \times 10^{-25} D^{1.65} [A \cdot m^{-1}/(n \cdot m^{-2} \cdot s^{-1})] \tag{9}$$

$$S_{\gamma 1} = 1.20 \times 10^{-25} D^{0.71} [A \cdot m^{-1}/(n \cdot m^{-2} \cdot s^{-1})] \tag{10}$$

$$S_T = 3.73 \times 10^{-25} D^{1.31} [A \cdot m^{-1}/(n \cdot m^{-2} \cdot s^{-1})] \tag{11}$$

and for the Pt-clad emitter detectors:

$$S_n = 1.63 \times 10^{-25} D^{1.82} [A \cdot m^{-1}/(n \cdot m^{-2} \cdot s^{-1})] \tag{12}$$

$$S_{\gamma 1} = 1.04 \times 10^{-25} D^{0.95} [A \cdot m^{-1}/(n \cdot m^{-2} \cdot s^{-1})] \tag{13}$$

$$S_T = 2.70 \times 10^{-25} D^{1.47} [A \cdot m^{-1}/(n \cdot m^{-2} \cdot s^{-1})] \tag{14}$$

Considering first the gamma-ray sensitivities, seen in Table I, the measured gamma-ray sensitivities for the Pt-clad-emitter detectors are close to those for the solid-Pt emitter detectors, for comparable geometries. This supports the proposition that the gamma-sensitivity is essentially a surface effect. The fact that the fits gave exponents smaller than unity is believed to result from a decreasing gamma-ray sensitivity with increasing insulation thickness. The effect of insulation thickness on gamma-ray sensitivity can be seen by comparing the results for detectors TC-1203, TC-1113 and TC-1111. Since insulation thickness does affect significantly the gamma-ray sensitivity of the Pt-clad emitter detectors, these gamma-ray sensitivities were fitted to a function of the form $$S_{\gamma 2} = k D^{60}/T^\beta \tag{15}$$

where T is the insulation thickness in mm. The best fit was given by $$S_{\gamma 2} = 0.59 \times 10^{-25} D^{1.22}/T^{0.51} [A \cdot m^{-1}/(n \cdot m^{-2} \cdot s^{-1})] \tag{16}$$

The quality of the fit obtained using equation (16) is significantly better than that obtained using equation (13), as can be seen from Table I.

The data for the solid Pt emitter detectors were fitted to equation (15), but with $\beta = 0.5$ (i.e. only $\alpha$ was allowed to vary, because of the limited number of data points). The result was $$S_{\gamma 2} = 0.70 \times 10^{-25} D^{0.87}/\sqrt{T} [A \cdot m^{-1}/(n \cdot m^{-2} \cdot s^{-1})] \tag{17}$$

This fit is only marginally better than that obtained using equation (10).

Considering the neutron sensitivities, as can be seen from Table II, the measured sensitivities of the solid Pt-emitter detectors are significantly greater than those of the Pt-clad emitter detectors, for comparable geometries. This is not unexpected because of the smaller neutron absorption cross-section of Inconel compared to Pt. The dominant parameter affecting sensitivity is the emitter diameter, although the insulation thickness did appear to have a secondary effect.

SUMMARY, CONCLUSIONS AND DISCUSSION

Neutron and gamma-ray sensitivities have been determined for self-powered detectors with solid-Pt and Pt-clad-Inconel emitters. In both types, the external gamma-ray response appears to be primarily a surface effect, and the sensitivity varies approximately linearly with emitter diameter and approximately inversely as the square root of the insulation thickness.

The neutron sensitivity, $S_n$, of platinum-emitter detectors also varies with emitter diameter as a power law. However, there is good evidence that a significant fraction of the neutron sensitivity can be attributed to neutron-capture events in the detector sheath, as well as the emitter.

The neutron and gamma-ray sensitivities obtained are valid for the reactor environment in which they were determined. Since the test reactor simulates a heavy-water-moderated, natural-uranium CANDU power-reactor core, the values for $S_n$ are valid for such a reactor. However, the values for $S_\gamma$ are not strictly applicable to this power reactor environment because they were determined after an irradiation of only $\sim 1$ hour. It is estimated that at equilibrium the gamma-ray sensitivities would be $\sim 10\%$ higher.

As already seen, it was found from the tests that the reduction in sensitivity of the platinum-clad emitters was very much less than proportional to the reduction in the amount of platinum. The effect is best illustrated by the response of the largest size emitter tested, which had an outside diameter of 1.44 mm and a platinum cladding thickness of only 0.062 mm. Compared to a detector with a solid platinum emitter of the same diameter, this detector had only 16% (about 1/6) of the amount of platinum, but, surprisingly, retained 76% of the neutron sensitivity and 96% of the gamma-ray sensitivity.

As a rule of thumb, the total sensitivity of a Pt-clad-emitter detector is, initially, $\sim 25\%$ lower than that of a solid-Pt-emitter detector of comparable geometry. This lower total sensitivity is primarily the result of a lower neutron sensitivity due to lower neutron absorption in Inconel. Since the neutron-capture cross-section of Inconel is small (4.2 barns) compared to that of the isotope of platinum that accounts for most of the reaction rate, $^{195}$Pt, (27 barns) the neutron sensitivity will burn up at only $\sim 1/6$ the rate of that due to neutron absorption in Pt.

As a direct result of the low burnup associated with detectors according to the present invention, it is possible to achieve a higher practical ratio of neutron to gamma-ray sensitivity than before (by increasing the emitter diameter) and hence a greater proportion of prompt response. Recent tests indicate an equilibrium value of 90% prompt for the 1.44 mm emitter diameter.

The effect of the lower burnup rate of the Pt-clad design, vis-a-vis the solid-Pt emitter, is illustrated in the following Tables IV and V which show the relative sensitivities and the prompt fractions respectively, predicted for detector TC-1204 (clad) and UC-107 (solid) as a function of time in a neutron flux of $2 \times 10^{18}$ n·m$^{-2}$·s$^{-1}$ in a CANDU power reactor. This flux is typical of that encountered in heavy-water-moderated, natural-uranium, reactors. The prompt fractions were predicted using equation (2).

TABLE IV

| Detector Serial No. | Type | Relative Sensitivity Per Unit Length | | | |
|---|---|---|---|---|---|
| | | T = 0a | T = 5A | T = 10a | T = 15a |
| UC-107 | Solid | 1.23 | 0.73 | 0.51 | 0.42 |
| TC-1204 | Clad | 1.0 | 0.84 | 0.75 | 0.68 |

TABLE V

| Detector Serial No. | Type | Prompt Fraction | | | |
|---|---|---|---|---|---|
| | | T = 0a | T = 5a | T = 10a | T = 15a |
| UC-107 | Solid | 0.91 | 0.85 | 0.79 | 0.75 |
| Tc-1204 | Clad | 0.90 | 0.88 | 0.86 | 0.85 |

A further advantage of this design is a significant saving in the amount of platinum used.

While all of the above advantages apply to all sizes of platinum-clad emitters tested, the improvements are greatest in the larger diameters.

In general, it will be seen from the above that the response characteristics of mixed-response detectors are more complex and consequently signal interpretation is more difficult than with single-response detectors. However, with the acceptance of such detectors for use in nuclear power reactors, some consideration can now be given to the signal mixtures which are relevant from the control or safety points of view in nuclear power reactors. One concept which has been developed by the present invention is to tailor the response of the detector to represent the actual fuel power rather than the local neutron or gamma-ray flux.

For a detector to represent the fuel power, the delayed response of the detector must be the same as the delayed energy deposition rate in the fuel, $P_D$, caused by the decay of fission products. The decay of the fission products gives rise to a delayed gamma-ray flux, $\phi_{\gamma D}$, which in turn will produce a delayed current in the detector $I_{\gamma D}$. Now if $$\frac{I_{\gamma D}}{I_T} = \frac{P_D}{P_T} \qquad (18)$$

where $I_T$ is the total current generated by the detector, and $P_T$ is the total fuel power, the signal from the detector will vary in close approximation to the fuel power.

Since the detector responds to both delayed and prompt gamma-rays, equation (18) can be conveniently rewritten $$\frac{I_\gamma}{I_T} = \left(\frac{P_D}{P_T}\right)\left(\frac{\phi_{\gamma T}}{\phi_{\gamma D}}\right) \qquad (19)$$

where $\phi_{\gamma T}$ is the total gamma-ray flux.

Thus, by choosing the detector dimensions and/or materials such that equation (19) is satisfied, one will obtain a fuel power detector.

Thus, it is within the scope of the present invention to provide a detector, of the type herein described, for use as a fuel power detector in a nuclear reactor, wherein the emitter core and outer layer have an electrical current output such that, for any neutron and gamma-ray flux intensity to which the detector is exposed in the reactor, the ratio of the current output of the detector due to reactor gamma-rays to the total current output of the detector is substantially equal to the product of the ratio of delayed reactor fuel power to the total reactor fuel power and the ratio of the total gamma-ray flux to the delayed gamma-ray flux.

We now consider the specific case of a heavy-water-moderated, natural-uranium, reactor. The following Table VI lists the typical values of the energy deposited in the fuel elements, from the various sources, at equilibrium, in a heavy-water-moderated, natural-uranium reactor. The energy sources have been divided into prompt and delayed groups and the percentage of the total energy associated with these groups is given in the last column.

TABLE VI
ENERGY DEPOSITED IN THE FUEL OF A HEAVY-WATER-MODERATED, NATURAL-URANIUM REACTOR

| SOURCE OF ENERGY | CLASSIFICATION | ENERGY/FISSION (MeV) | COMPONENT % | GROUP % |
|---|---|---|---|---|
| K.E. of fission fragments | prompt neutron | 166.0 | 86.8 | |
| K.E. of neutrons from fission | prompt neutron | 1.4 | 0.7 | |
| γ-rays from fission | prompt γ-ray | 5.8 | 3.0 | 93.2 |
| neutron capture γ-rays | prompt γ-ray | 5.1 | 2.7 | |
| γ-rays from fission products | delayed γ-rays | 4.9 | 2.6 | |
| Fission product β-decay | delayed β-decay | 7.4 | 3.9 | |
| Neutron induced β-decay in reactor hardware | delayed β-decay | 0.6 | 0.3 | 6.8 |

From the Table we see that delayed gamma-rays represent 31% of the total gamma-ray energy and the delayed energy deposition rate in the fuel is 6.8% of the total, i.e.

$$\frac{P_D}{P_T} = 0.068 \quad (20)$$

$$\frac{\phi_{\gamma D}}{\phi_\gamma} = 0.31 \quad (21)$$

Thus, to achieve a fuel power detector we require, from equation (19), that the gamma-ray-induced current be 22% of the total. Since $$\frac{I_\gamma}{I_T} = \frac{S_\gamma}{S_T} \quad (22)$$

we see that by combining equations (13) and (14) the desired relative gamma-ray sensitivity can be achieved with a Pt-clad detector, having an Inconel core, if $$\frac{2.70}{1.40} D^{(1.47-0.95)} = \frac{1}{0.22} \quad (23)$$

$$D = 2.94 \text{ mm} \quad (24)$$

Thus, a Pt-clad detector with an emitter diameter of 2.9 mm would generate a signal proportional to the fuel power in a heavy-water-moderated, natural-uranium, reactor.

From the above, it will be seen that it is within the scope of the present invention to provide a detector of the type previously described for use as a fuel power detector in a heavy-water-moderated, natural uranium reactor, wherein the emitter core is a nickel-base alloy containing by weight 76% nickel, 15.8% chromium, 7.20% iron, 0.20% silicon, 0.10% copper, 0.007% sulphur and 0.04% carbon, with less than 0.1% by weight cobalt and 0.2% by weight manganese, and the emitter outer layer is of platinum and has an outside diameter of the order of 2.9 mm.

By choosing different materials for the emitter core and sheath, from among those listed, the same end can be achieved with different detector dimensions.

We claim:

1. A self-powered neutron and gamma-ray flux detector, comprising:
   (a) an emitter core,
   (b) an emitter outer layer around the core,
   (c) a collector around the emitter outer layer, and
   (d) dielectric insulation electrically insulating the emitter outer layer from the collector,
   and wherein the improvement comprises:
   (e) the emitter core is of at least one material selected from the group consisting of nickel, iron, titanium and alloys based on these metals, and the emitter outer layer has a thickness in the range of the order of 0.03 mm to of the order of 0.062 mm and is of at least one material selected from the group consisting of platinum, tantalum, osmium, molybdenum and cerium.

* * * * *